(12) United States Patent
Han et al.

(10) Patent No.: US 11,461,552 B2
(45) Date of Patent: Oct. 4, 2022

(54) AUTOMATED DOCUMENT REVIEW SYSTEM COMBINING DETERMINISTIC AND MACHINE LEARNING ALGORITHMS FOR LEGAL DOCUMENT REVIEW

(71) Applicant: SAP SE, Walldorf (DE)

(72) Inventors: Jianglei Han, Singapore (SG); Traci Zheng Wen Lim, Singapore (SG); Juanlei Rocco Hu, Singapore (SG); Lijie Quan, Singapore (SG); Wei Jin, Singapore (SG); Lingxiao Liang, Singapore (SG)

(73) Assignee: SAP SE, Walldorf (DE)

( * ) Notice: Subject to any disclaimer, the term of this patent is extended or adjusted under 35 U.S.C. 154(b) by 192 days.

(21) Appl. No.: 16/920,916

(22) Filed: Jul. 6, 2020

(65) Prior Publication Data
US 2022/0004713 A1   Jan. 6, 2022

(51) Int. Cl.
*G06F 40/289* (2020.01)
*G06N 20/00* (2019.01)
*G06F 40/284* (2020.01)
*G06Q 50/18* (2012.01)
*G06V 30/148* (2022.01)

(52) U.S. Cl.
CPC .......... *G06F 40/289* (2020.01); *G06F 40/284* (2020.01); *G06N 20/00* (2019.01); *G06Q 50/18* (2013.01); *G06V 30/153* (2022.01)

(58) Field of Classification Search
CPC ..... G06F 40/289; G06F 40/284; G06N 20/00; G06Q 50/18; G06V 30/153; G06V 30/19113; G06V 30/19147; G06V 30/242; G06V 30/413
USPC .............................................................. 704/9
See application file for complete search history.

(56) References Cited

U.S. PATENT DOCUMENTS 10,133,791 B1 * 11/2018 Chan ...................... G06N 20/20

\* cited by examiner

*Primary Examiner* — Thierry L Pham
(74) *Attorney, Agent, or Firm* — Fish & Richardson P.C.

(57) ABSTRACT

Methods, systems, and computer-readable storage media for receiving, by an automated review system, a legal document as a computer-readable file, and determining, by the automated review system, that the legal document is of a first type, and in response: converting the legal document to a set of images, extracting text data from one or more images in the set of images, the text data including sub-sets of text data, each sub-set of text data representing text in a respective clause of a set of clauses of the legal document, for each sub-set of text data receiving a prediction from a machine learning (ML) model in a set of ML models, the ML model being specific to a clause in the set of clauses, and outputting a set of predictions and respective prediction values for display in a user interface (UI).

20 Claims, 5 Drawing Sheets

Case ID: 306247987 — _302_

| Data Field | Values | Predicted Score | Further Review | Approve |
|---|---|---|---|---|
| DPA Audit Rights | None | 0.99 _310_ | ☐ | Ⓝ |
| EU Access | No | 0.99 | ☐ | Ⓝ |
| Excess Usage | No | 0.99 | ☐ | Ⓝ |
| Excess Usage (refs) | Data Not Found | 0.99 | ☐ | Ⓝ |
| Exchange Rights, SWAP Rights | None | 0.99 | ☐ | Ⓝ |
| Exchange Rights, SWAP Rights (date) | Data Not Found | 0.99 | ☐ | Ⓝ |
| Extended Subscription Term | No | 0.51 | ☐ | Ⓝ |
| Extended Subscription Term (days) | Data Not Found | 0.51 | ☐ | Ⓝ |
| Extension Policy | Not Applicable | 0.45 | ☐ | Ⓝ |
| Extension Policy (reference) | Data Not Found | 0.2 | ☐ | Ⓝ |
| Framework Agmt – Option 1 | - | 0 | ☐ | (Ⓝ) |
| Framework Agmt – Option 2 | - | 0 | ☐ | (Ⓝ) |
| Framework Agmt – Option 3 | No | 0.98 | ☐ | Ⓝ |
| Framework Agmt – Option 3 (ref) | Data Not Found | 0.98 | ☐ | Ⓝ |
| Legacy Paper | No | 0.25 | ☐ | Ⓝ |

---

_300_ / _304_

123 Maple St., Anytown, USA 12345
("Acme")

and

123 Elm St., Anytown, USA 12345
("Customer")

1. AMENDMENT TO ORDER FORM
This Amendment to Order Form ("Amendment") constitutes an offer by Acme and, when signed by Customer, amends Order Form #0220XYZ123 ("Order Form") to add Acme Cloud Service ("ACS"), and becomes a binding agreement between Acme and Customer.

Acme agrees to be bound to the fees quoted in this Amendment until midnight in Customer's time zone on the date indicated below ("Offer Expiration"). If Acme has received this Amendment duly signed by Customer on or prior to the Offer Expiration, the fees below will be valid for the duration of the Subscription Term defined in the Order Form.

Offer Expiration: 10/31/2020

2. ADDITIONAL CLOUD SERVICE
The table identifying ACS in the Order Form is hereby amended by adding the ACS set forth below and will be subject to the Cloud Services Supplemental Terms and Conditions located at http://acme.com/agmnts/cloud-services.html Period 1 From 07/23/2019 to 04/01/2021

| ACS | Usage Metric | Usage Metric Limit | Annual Fee | Start Date | End Date | Total Fee (USD) |
|---|---|---|---|---|---|---|
| Acme Prod'y Hub | Users | 10 | 18,360 | 07/23/2020 | 04/01/2020 | 12,743 |

Total Fee (USD) 12,743

_Acme Confidential_

Page 1 of 2

AUTOMATED DOCUMENT REVIEW SYSTEM COMBINING DETERMINISTIC AND MACHINE LEARNING ALGORITHMS FOR LEGAL DOCUMENT REVIEW

BACKGROUND

Document review can be described as a process of reviewing content of documents to identify information relevant to one or more topics. In the legal context, legal documents can include contracts that define obligations between parties to a contract. Stakeholders typically perform document review in order to understand contractual obligations, navigate client or customer relationships, and understand compliance risk. Traditionally, document review is a highly manual, time-intensive, error prone and expensive process.

Software-based automated document review systems have been developed in an effort to achieve accuracy, cost, and compliance-related improvements. For example, some automated document review systems employ machine learning (ML) for review of legal documents. However, application of ML in the context of legal document review has been challenging in view of application of imperfect models with deterministic program rules, sophisticated data engineering techniques, and relative absence of expert input. As a consequence, traditional automated document review systems are difficult to develop and deploy, and are not as accurate, or resource-efficient as desirable.

SUMMARY

Implementations of the present disclosure are directed to automated review of legal documents. More particularly, implementations of the present disclosure are directed to an automated document review system having a hybrid architecture that combines deterministic and machine learning (ML) algorithms for automated review of legal documents.

In some implementations, actions include receiving, by an automated review system, a legal document as a computer-readable file, and determining, by the automated review system, that the legal document is of a first type, and in response: converting the legal document to a set of images, extracting text data from one or more images in the set of images, the text data including sub-sets of text data, each sub-set of text data representing text in a respective clause of a set of clauses of the legal document, for each sub-set of text data receiving a prediction from a machine learning (ML) model in a set of ML models, the ML model being specific to a clause in the set of clauses, and outputting a set of predictions and respective prediction values for display in a user interface (UI). Other implementations of this aspect include corresponding systems, apparatus, and computer programs, configured to perform the actions of the methods, encoded on computer storage devices.

These and other implementations can each optionally include one or more of the following features: extracting text data from one or more images in the set of images includes, for at least one image in the set of images, determining that the at least one image depicts a table, and extracting text data from the table within the at least one image; at least one ML model in the set of ML models is trained using training data including a set of relevant sentences for each clause in the set of clauses, each relevant sentence determined to be relevant to a legal term occurring within a respective clause; the set of relevant sentences is provided at least partially based on, for each clause in the set of clauses, representing the legal term as a hash structure, parsing the legal document into an array of sentences, and identifying matches between tokens of sentences and the hash structure; actions further include receiving user input provided through the UI, the user input changing at least one prediction value for a respective clause, and being used to retrain a respective ML model; the set of ML models includes a first ML model of a first type that is specific to a first clause, and a second ML model of a second type that is specific to a second clause, the second type being different from the first type; and the first type includes an image-based document.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 3 depicts a screenshot of an example user interface (UI) in accordance with implementations of the present disclosure.

Like reference symbols in the various drawings indicate like elements.

DETAILED DESCRIPTION

Implementations of the present disclosure are directed to automated review of legal documents. More particularly, implementations of the present disclosure are directed to an automated document review system having a hybrid architecture that combines deterministic and machine learning (ML) algorithms for automated review of legal documents. Implementations can include actions of receiving, by an automated review system, a legal document as a computer-readable file, and determining, by the automated review system, that the legal document is of a first type, and in response: converting the legal document to a set of images, extracting text data from one or more images in the set of images, the text data including sub-sets of text data, each sub-set of text data representing text in a respective clause of a set of clauses of the legal document, for each sub-set of text data receiving a prediction from a machine learning (ML) model in a set of ML models, the ML model being specific to a clause in the set of clauses, and outputting a set of predictions and respective prediction values for display in a user interface (UI).

To provide further context for implementations of the present disclosure, and as introduced above, document review can be described as a process of reviewing content of documents to identify information relevant to one or more topics. In the legal context, legal documents can include contracts that define obligations between parties to a contract. Stakeholders typically perform document review in order to understand contractual obligations, navigate client or customer relationships, and understand compliance risk. Traditionally, document review is a highly manual, time-intensive, error prone and expensive process.

Software-based automated document review systems have been developed in an effort to achieve accuracy, cost, and compliance-related improvements. For example, some automated document review systems employ ML (also referred to herein as artificial intelligence (AI)) for review of legal documents. However, application of ML in the context of legal document review has been challenging in view of application of imperfect models with deterministic program rules, sophisticated data engineering techniques, and relative absence of expert input. As a consequence, traditional automated document review systems are difficult to develop and deploy, and are not as accurate, or resource-efficient as desirable.

More particularly, there are several challenges in automating legal document review. For example, legal documents, such as contracts, are typically stored in a variety of file formats or even in hard copy, making them difficult for computer programs to read. As another example, many state-of-the-art ML algorithms do not readily incorporate expert knowledge into their training, resulting in decreased accuracy of the resulting ML models, as well as inefficiencies in technical resources expended to process legal documents. As still another example, while ML models used in traditional automated document review systems are able to capture the rule-like aspects of the law to some degree, accuracy of the ML models significantly decreases when faced with the lexical variability of the law in practice.

In view of this, and as described in further detail herein, implementations of the present disclosure provide an end-to-end automated document review system that combines ML, rule-based lexical algorithms, and human-in-the-loop correction. The automated document review system of the present disclosure is referred to herein as digital contract data (DCD) AI system.

In accordance with implementations of the present disclosure, and as described in further detail herein, the automated document review system includes a hybrid architecture that tackles existing challenges to automating document review, such as challenges discussed herein. Among other functionality, the hybrid architecture is able to turn unstructured contract data in a variety of filetypes to structured document data, ascertain, given a contract, multiple types (e.g., over 50 different types) of legal properties, and extract relevant clauses and contract-metadata from a contract. The automated document review system of the present disclosure complements the power of advances in ML for text classification by using a highly customized, modified optical character recognition (OCR), referred to herein as OCR+, and deterministic post-processing algorithms. In order to continually incorporate human feedback for improvement of ML models, human-in-the loop prediction correction of ML model predictions is provided.

Figure 1:
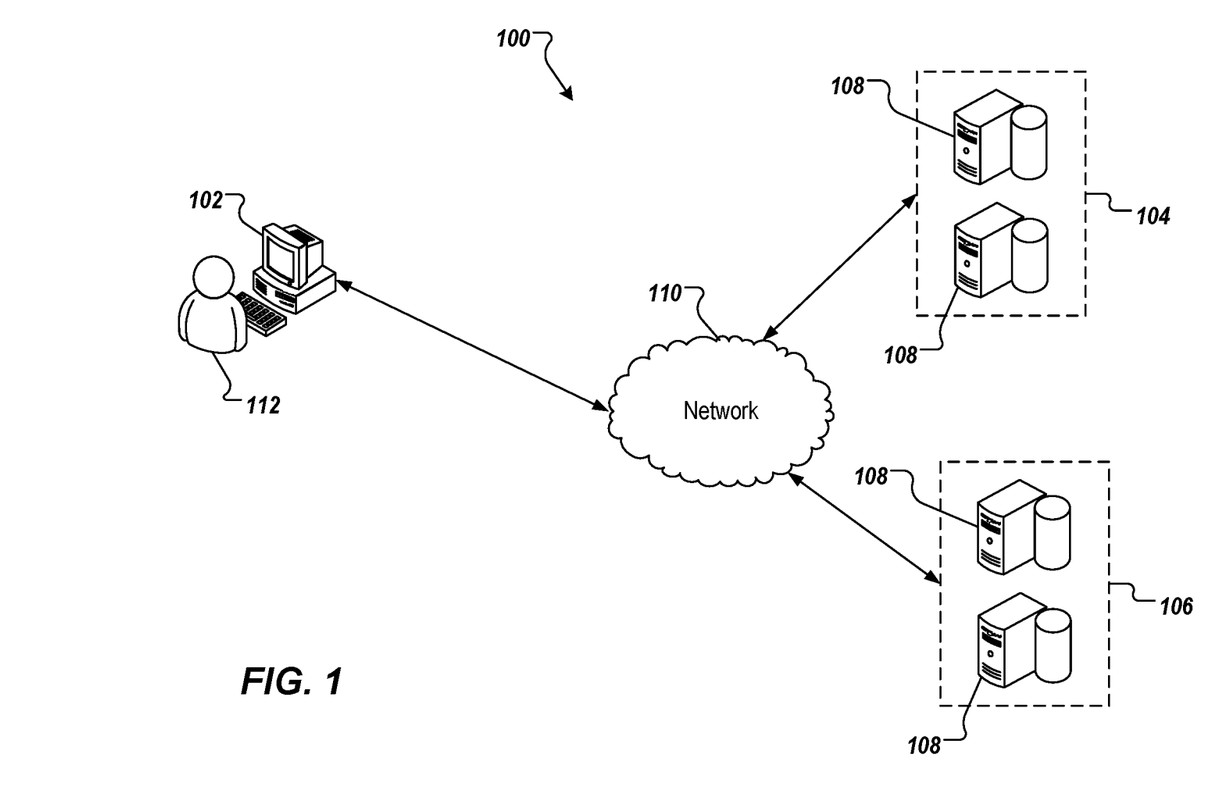
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 110, and server systems 104, 106. The server systems 104, 106 each include one or more server devices and databases 108 (e.g., processors, memory). In the depicted example, a user 112 interacts with the client device 102.

In some examples, the client device 102 can communicate with the server system 104 and/or the server system 106 over the network 110. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each of the server systems 104, 106 includes at least one server and at least one data store. In the example of FIG. 1, the server systems 104, 106 are intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host an automated document review system employing a hybrid architecture for automated review of legal documents. For example, one or more legal documents, each provided as a computer-readable file, can be processed by the automated document review system, as described herein. In some examples, the server system 106 can store the one or more legal documents, which are transmitted to the server system 104 for processing. In some examples, results of the automated document review are displayed to the user 112 within a UI displayed by the client device 102. The user 112 can provide feedback with respect to accuracy of one or more predictions provided by the automated document review system through the UI.

Figure 2:
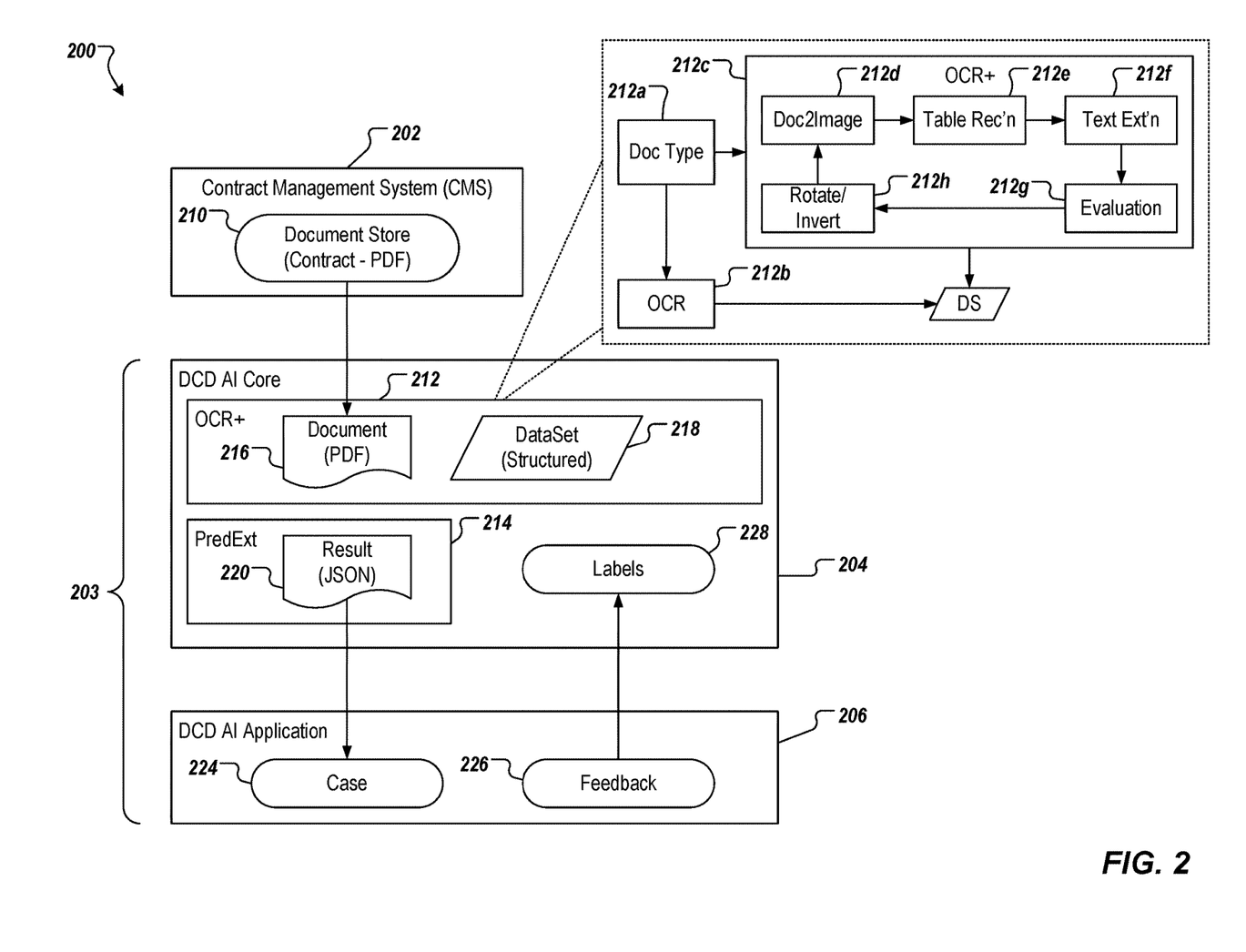
FIG. 2 depicts an example conceptual architecture for automated document review in accordance with implementations of the present disclosure.

FIG. 2 depicts an example conceptual architecture 200 for automated document review in accordance with implementations of the present disclosure. The example conceptual architecture 200 includes a contract management system (CMS) 202 (e.g., hosted on the server system 106 of FIG. 1), and a DCD AI system 203 (e.g., hosted on the server system 104 of FIG. 1) that includes a DCD AI Core 204, and a DCD AI Application 206. In some examples, the CMS 202 is operated by an enterprise to manage contracts that the enterprise makes with one or more second parties. In some examples, the DCD AI Core 204 and the DCD AI Application 206 processes legal documents (e.g., contracts) provided from the CMS 202, as described herein. The DCD AI Core 204 processes legal documents through the hybrid architecture of the present disclosure and provides output to the DCD AI Application 206. A user can interact with the DCD AI Application 206 through one or more UIs to review results of processing of the legal documents and provide feedback.

In further detail, as depicted in the example of FIG. 2, the CMS 202 includes a document store 210 that stores one or more legal documents. In some examples, the legal documents are stored in one or more file formats. An example file format includes the portable document format (PDF), which can be described as a file format that captures the elements of a printed document as an electronic image.

The DCD AI Core 204 includes an OCR+ module 212 and a prediction and extraction (PredExt) module 214. As described in further detail herein, the OCR+ module 212 receives a legal document 216 from the CMS 202 and processes the legal document 216 using one of OCR functionality and OCR+ functionality to provide a structured dataset 218, which includes text data that is to be processed for predictions, as described in further detail herein. In some examples, the structured dataset 218 is provided in a comma-separated value format (.csv). In the context of a legal document, an example structured dataset in .csv format can include, without limitation:

```
enriched_ocr_output
    ocrplus_text
    ocrplus_metadata
    ocrplus_tables
    ocrplus_urls
    ocrplus_headers
    ocrplus_score
    coor_json
```

In the example of FIG. 2, the OCR+ module 212 includes sub-modules for performing operations as described herein. The example sub-modules include a document type determination sub-module 212a, an OCR sub-module 212b, and an OCR+ sub-module 212c. In some examples, depending on document type, the OCR sub-module 212b or the OCR+ sub-module 212c provides the structured dataset 218. In the example of FIG. 2, the OCR+ sub-module 212c includes a document-to-image conversion sub-module 212d, a table recognition sub-module 212e, a text extraction sub-module 212f, an evaluation sub-module 212g, and a rotate/invert sub-module 212h.

The PredExt module 214 receives the structured dataset 218 and generates a results file 220. In some examples, the results file 220 is provided in Javascript object notation (JSON) format, which can be described as an open standard file format, and data interchange format, that uses human-readable text to store and transmit data objects that include attribute-value pairs and array data types. In the context of a legal document, an example result in JSON format with example attribute-value pairs can include, without limitation:

```
{
    "output": [{
        "PREDICTED_VALUE": "Deleted",
        "CONFIDENCE_LEVEL": 0.98,
        "HGHLGTD_COORDINATES": "\\"
        page\\ ": 0, \\"
        pos\\ ":[0, 0, 0, 0]",
        "DATA_FIELD": "ANALYSES",
        "DOCUMENT_USED": "TOF2.pdf"
    }, {
        "PREDICTED_VALUE": "no",
        "CONFIDENCE_LEVEL": 0.0,
        "HGHLGTD_COORDINATES": "\\"
        page\\ ": 0, \\"
        pos\\ ":[0, 0, 0, 0]",
        "DATA_FIELD": "APPLICATION_SLA",
        "DOCUMENT_USED": "TOF2.pdf"
    }, {
        "PREDICTED_VALUE": "—",
        "CONFIDENCE_LEVEL": 0.0,
        "HGHLGTD_COORDINATES": "\\"
        page\\ ": 0, \\"
        pos\\ ":[0, 0, 0, 0]",
        "DATA_FIELD": "COMT_BILL_INT",
        "DOCUMENT_USED": "TOF2.pdf"
    }, {
        "PREDICTED_VALUE": "—",
        "CONFIDENCE_LEVEL": 0.0,
        "HGHLGTD_COORDINATES": "\\"
        page\\ ": 0, \\"
        pos\\ ":[0, 0, 0, 0]",
        "DATA_FIELD": "CONS_BILL_SCHD",
        "DOCUMENT_USED": "TOF2.pdf"
    }, {
        "PREDICTED_VALUE": "Not Applicable",
        "CONFIDENCE_LEVEL": 0.99,
        "HGHLGTD_COORDINATES": "\\"
        page\\ ": 0, \\"
        pos\\ ":[0, 0, 0, 0]",
        "DATA_FIELD": "STANDARD",
        "DOCUMENT_USED": "TOF2.pdf"
    }, {
```

```
        "PREDICTED_VALUE": "None",
        "CONFIDENCE_LEVEL": 0.99,
        "HGHLGTD_COORDINATES": "\\"
        page\\ ": 0, \\"
        pos\\ ":[0, 0, 0, 0]",
        "DATA_FIELD": "AUDIT_RIGHTS",
        "DOCUMENT_USED": "TOF2.pdf"
}, {
        "PREDICTED_VALUE": "None",
        "CONFIDENCE_LEVEL": 0.99,
        "HGHLGTD_COORDINATES": "\\"
        page\\ ": 0, \\"
        pos\\ ":[0, 0, 0, 0]",
        "DATA_FIELD": "DIVESTURE",
        "DOCUMENT_USED": "TOF2.pdf"
}, {
        "PREDICTED_VALUE": "—",
        "CONFIDENCE_LEVEL": 0.0,
        "HGHLGTD_COORDINATES": "\\"
        page\\ ": 0, \\"
        pos\\ ":[0, 0, 0, 0]",
        "DATA_FIELD": "DIVESTITURE_REF",
        "DOCUMENT_USED": "TOF2.pdf"
}, {
        "PREDICTED_VALUE": "Yes",
        "CONFIDENCE_LEVEL": 0.74,
        "HGHLGTD_COORDINATES": {
            "page": 0,
            "pos": [0, 0, 0, 0]
        },
        "DATA_FIELD": "EU_ACCESS",
        "DOCUMENT_USED": "TOF2.pdf"
}, {
        "PREDICTED_VALUE": "No",
        "CONFIDENCE_LEVEL": 0.76,
        "HGHLGTD_COORDINATES": "\\"
        page\\ ": 0, \\"
        pos\\ ":[0, 0, 0, 0]",
        "DATA_FIELD": "EXCESS_USAGE",
        "DOCUMENT_USED": "TOF2.pdf"
}, {
        "PREDICTED_VALUE": "Data not found",
        "CONFIDENCE_LEVEL": 0.0,
        "HGHLGTD_COORDINATES": "\\"
        page\\ ": 0, \\"
        pos\\ ":[0, 0, 0, 0]",
        "DATA_FIELD": "EXCESS_USAGE_REF",
        "DOCUMENT_USED": "TOF2.pdf"
}, {
        "PREDICTED_VALUE": "None",
        "CONFIDENCE_LEVEL": 0.99,
        "HGHLGTD_COORDINATES": "\\"
        page\\ ": 0, \\"
        pos\\ ":[0, 0, 0, 0]",
        "DATA_FIELD": "EXCHG_SWAP_RIGHTS",
        "DOCUMENT_USED": "TOF2.pdf"
}, {
        "PREDICTED_VALUE": "Data not found",
        "CONFIDENCE_LEVEL": 0,
        "HGHLGTD_COORDINATES": "\\"
        page\\ ": 0, \\"
        pos\\ ":[0, 0, 0, 0]}",
        "DATA_FIELD": "EXCHG_SWAP_RIGHTS_ENDDATE_CLD",
        "DOCUMENT_USED": "TOF2.pdf"
}, {
        "PREDICTED_VALUE": "—",
        "CONFIDENCE_LEVEL": 0.0,
        "HGHLGTD_COORDINATES": "\\"
        page\\ ": 0, \\"
        pos\\ ":[0, 0, 0, 0]",
        "DATA_FIELD": "EX_RIGHT_SWAP_RIGHT_DATE2",
        "DOCUMENT_USED": "TOF2.pdf"
}, {
        "PREDICTED_VALUE": "—",
        "CONFIDENCE_LEVEL": 0.0,
        "HGHLGTD_COORDINATES": "\\"
        page\\ ": 0, \\"
        pos\\ ":[0, 0, 0, 0]",
        "DATA_FIELD": "EX_RIGHT_SWAP_RIGHT_DATE3",
```

```
        "DOCUMENT_USED": "TOF2.pdf"
    }, {
        "PREDICTED_VALUE": "No",
        "CONFIDENCE_LEVEL": 0.99,
        "HGHLGTD_COORDINATES": "\"
page\\ ": 0, \\"
pos\\ ":[0, 0, 0, 0]",
        "DATA_FIELD": "EXTND_SUBSCR_TERM",
        "DOCUMENT_USED": "TOF2.pdf"
    }, {
        "PREDICTED_VALUE": "Data not found",
        "CONFIDENCE_LEVEL": 0.0,
        "HGHLGTD_COORDINATES": "\"
page\\ ": 0, \\"
pos\\ ":[0, 0, 0, 0]",
        "DATA_FIELD": "EXT_SUB_TERMS_NO_OF_DAYS",
        "DOCUMENT_USED": "TOF2.pdf"
    }, {
        "PREDICTED_VALUE": "Not Applicable",
        "CONFIDENCE_LEVEL": 0.99,
        "HGHLGTD_COORDINATES": "\"
page\\ ": 0, \\"
pos\\ ":[0, 0, 0, 0]",
        "DATA_FIELD": "EXT_POLICY",
        "DOCUMENT_USED": "TOF2.pdf"
    }, {
        "PREDICTED_VALUE": "Data not found",
        "CONFIDENCE_LEVEL": 0.6,
        "HGHLGTD_COORDINATES": "\"
page\\ ": 0, \\"
pos\\ ":[0, 0, 0, 0}]",
        "DATA_FIELD": "EXTENSION_POLICY_REF",
        "DOCUMENT_USED": "TOF2.pdf"
    }, {
        "PREDICTED_VALUE": "No",
        "CONFIDENCE_LEVEL": 0.99,
        "HGHLGTD_COORDINATES": "\"
page\\ ": 0, \\"
pos\\ ":[0, 0, 0, 0]",
        "DATA_FIELD": "FINANCING_CL",
        "DOCUMENT_USED": "TOF2.pdf"
    }, {
        "PREDICTED_VALUE": "Data not found",
        "CONFIDENCE_LEVEL": 0.0,
        "HGHLGTD_COORDINATES": "\"
page\\ ": 0, \\"
pos\\ ":[0, 0, 0, 0]",
        "DATA_FIELD": "FINANCING_OPTION_REF",
        "DOCUMENT_USED": "TOF2.pdf"
    }, {
        "PREDICTED_VALUE": "—",
        "CONFIDENCE_LEVEL": 0.0,
        "HGHLGTD_COORDINATES": "\"
page\\ ": 0, \\"
pos\\ ":[0, 0, 0, 0]",
        "DATA_FIELD": "FRAME_WRK_AGREEMNT",
        "DOCUMENT_USED": "TOF2.pdf"
    }, {
        "PREDICTED_VALUE": "—",
        "CONFIDENCE_LEVEL": 0.0,
        "HGHLGTD_COORDINATES": "\"
page\\ ": 0, \\"
pos\\ ":[0, 0, 0, 0]",
        "DATA_FIELD": "FRAMEWORK_AGREE_OPT2",
        "DOCUMENT_USED": "TOF2.pdf"
    }, {
        "PREDICTED_VALUE": "Yes",
        "CONFIDENCE_LEVEL": 0.9,
        "HGHLGTD_COORDINATES": "\"
page\\ ": 0, \\"
pos\\ ":[0, 0, 0, 0}]",
        "DATA_FIELD": "FRAMEWORK_AGREE_OPT3",
        "DOCUMENT_USED": "TOF2.pdf"
    }, {
        "PREDICTED_VALUE": "Data not found",
        "CONFIDENCE_LEVEL": 0.7,
        "HGHLGTD_COORDINATES": "\"
page\\ ": 0, \\"
pos\\ ":[0, 0, 0, 0}]",
```

-continued

```
        "DATA_FIELD": "FRAMEWORK_AGREE_OPT3_REF",
        "DOCUMENT_USED": "TOF2.pdf"
    }, {
        "PREDICTED_VALUE": "—",
        "CONFIDENCE_LEVEL": 0.0,
        "HGHLGTD_COORDINATES": "\\"
        page\\ ": 0, \\"
        pos\\ ":[0, 0, 0, 0]",
        "DATA_FIELD": "FUTURE_FUNC",
        "DOCUMENT_USED": "TOF2.pdf"
    }, {
        "PREDICTED_VALUE": "—",
        "CONFIDENCE_LEVEL": 0.0,
        "HGHLGTD_COORDINATES": "\\"
        page\\ ": 0, \\"
        pos\\ ":[0, 0, 0, 0]",
        "DATA_FIELD": "LEGACY_PAPER",
        "DOCUMENT_USED": "TOF2.pdf"
    }, {
        "PREDICTED_VALUE": "No",
        "CONFIDENCE_LEVEL": 0.95,
        "HGHLGTD_COORDINATES": "\\"
        page\\ ": 0, \\"
        pos\\ ":[0, 0, 0, 0]",
        "DATA_FIELD": "NON_STD_LIABILITIES",
        "DOCUMENT_USED": "TOF2.pdf"
    }, {
        "PREDICTED_VALUE": "Data not found",
        "CONFIDENCE_LEVEL": 0.0,
        "HGHLGTD_COORDINATES": "\\"
        page\\ ": 0, \\"
        pos\\ ":[0, 0, 0, 0]",
        "DATA_FIELD": "NON_STANDARD_LIAB_REF",
        "DOCUMENT_USED": "TOF2.pdf"
    }, {
        "PREDICTED_VALUE": "No",
        "CONFIDENCE_LEVEL": 0.98,
        "HGHLGTD_COORDINATES": "\\"
        page\\ ": 0, \\"
        pos\\ ":[0, 0, 0, 0]",
        "DATA_FIELD": "NON_STD_WRNTY",
        "DOCUMENT_USED": "TOF2.pdf"
    }, {
        "PREDICTED_VALUE": "Data not found",
        "CONFIDENCE_LEVEL": 0.0,
        "HGHLGTD_COORDINATES": "\\"
        page\\ ": 0, \\"
        pos\\ ":[0, 0, 0, 0]",
        "DATA_FIELD": "NON_STANDARD_WARR_REF",
        "DOCUMENT_USED": "TOF2.pdf"
    }, {
        "PREDICTED_VALUE": "—",
        "CONFIDENCE_LEVEL": 0.0,
        "HGHLGTD_COORDINATES": "\\"
        page\\ ": 0, \\"
        pos\\ ":[0, 0, 0, 0]",
        "DATA_FIELD": "PLATFORM_SLA",
        "DOCUMENT_USED": "TOF2.pdf"
    }, {
        "PREDICTED_VALUE": "Custom",
        "CONFIDENCE_LEVEL": 0.97,
        "HGHLGTD_COORDINATES": "\\"
        page\\ ": 0, \\"
        pos\\ ":[0, 0, 0, 0]",
        "DATA_FIELD": "PRICE_PROTECTION_CLD",
        "DOCUMENT_USED": "TOF2.pdf"
    }, {
        "PREDICTED_VALUE": "Data not found",
        "CONFIDENCE_LEVEL": 0,
        "HGHLGTD_COORDINATES": "\\"
        page\\ ": 0, \\"
        pos\\ ":[0, 0, 0, 0]",
        "DATA_FIELD": "PRC_PROTECTION_DT",
        "DOCUMENT_USED": "TOF2.pdf"
    }, {
        "PREDICTED_VALUE": "No",
        "CONFIDENCE_LEVEL": 0.95,
        "HGHLGTD_COORDINATES": "\\"
        page\\ ": 0, \\"
```

```
            pos\\ ":[0, 0, 0, 0]",
            "DATA_FIELD": "RELATION_AMEND",
            "DOCUMENT_USED": "TOF2.pdf"
        }, {
            "PREDICTED_VALUE": "Data not found",
            "CONFIDENCE_LEVEL": 0.0,
            "HGHLGTD_COORDINATES": "\\"
            page\\ ": 0, \\"
            pos\\ ":[0, 0, 0, 0]",
            "DATA_FIELD": "RELATION_AMEND_REF",
            "DOCUMENT_USED": "TOF2.pdf"
        }, {
            "PREDICTED_VALUE": "No",
            "CONFIDENCE_LEVEL": 0.99,
            "HGHLGTD_COORDINATES": "\\"
            page\\ ": 0, \\"
            pos\\ ":[0, 0, 0, 0]",
            "DATA_FIELD": "RELATION_RENEW",
            "DOCUMENT_USED": "TOF2.pdf"
        }, {
            "PREDICTED_VALUE": "Data not found",
            "CONFIDENCE_LEVEL": 0.0,
            "HGHLGTD_COORDINATES": "\\"
            page\\ ": 0, \\"
            pos\\ ":[0, 0, 0, 0]",
            "DATA_FIELD": "RELATION_RENEW_REF",
            "DOCUMENT_USED": "TOF2.pdf"
        }, {
            "PREDICTED_VALUE": "No",
            "CONFIDENCE_LEVEL": 0.98,
            "HGHLGTD_COORDINATES": "\\"
            page\\ ": 0, \\"
            pos\\ ":[0, 0, 0, 0]",
            "DATA_FIELD": "RELATION_REPLACE",
            "DOCUMENT_USED": "TOF2.pdf"
        }, {
            "PREDICTED_VALUE": "Data not found",
            "CONFIDENCE_LEVEL": 0.0,
            "HGHLGTD_COORDINATES": "\\"
            page\\ ": 0, \\"
            pos\\ ":[0, 0, 0, 0]",
            "DATA_FIELD": "RELATION_REPLACE_REF",
            "DOCUMENT_USED": "TOF2.pdf"
        }, {
            "PREDICTED_VALUE": "No",
            "CONFIDENCE_LEVEL": 0.98,
            "HGHLGTD_COORDINATES": "\\"
            page\\ ": 0, \\"
            pos\\ ":[0, 0, 0, 0]",
            "DATA_FIELD": "RELATION_TERMINATION",
            "DOCUMENT_USED": "TOF2.pdf"
        }, {
            "PREDICTED_VALUE": "Data not found",
            "CONFIDENCE_LEVEL": 0.0,
            "HGHLGTD_COORDINATES": "\\"
            page\\ ": 0, \\"
            pos\\ ":[0, 0, 0, 0]",
            "DATA_FIELD": "RELATION_TERMINATION_REF",
            "DOCUMENT_USED": "TOF2.pdf"
        }, {
            "PREDICTED_VALUE": "—",
            "CONFIDENCE_LEVEL": 0.0,
            "HGHLGTD_COORDINATES": "\\"
            page\\ ": 0, \\"
            pos\\ ":[0, 0, 0, 0]",
            "DATA_FIELD": "RELATION_UPSELL_RENEW",
            "DOCUMENT_USED": "TOF2.pdf"
        }, {
            "PREDICTED_VALUE": "Yes",
            "CONFIDENCE_LEVEL": 0.5,
            "HGHLGTD_COORDINATES": "\\"
            page\\ ": 4, \\"
            pos\\ ":[0.36124121779859486, 0.10358114233907526, 0.629976580796253, 0.11310063463281958]",
            "DATA_FIELD": "RENEWAL_PRICING",
            "DOCUMENT_USED": "TOF2.pdf"
        }, {
            "PREDICTED_VALUE": "non-standard",
            "CONFIDENCE_LEVEL": 0,
```

```
            "HGHLGTD_COORDINATES": "\\"
            page\\ ": 4, \\"
            pos\\ ":[0.36124121779859486, 0.10358114233907526,
0.629976580796253, 0.11310063463281958]",
            "DATA_FIELD": "PRICE_RENEWAL_REF",
            "DOCUMENT_USED": "TOF2.pdf"
    }, {
            "PREDICTED_VALUE": "Data not found",
            "CONFIDENCE_LEVEL": 0.0,
            "HGHLGTD_COORDINATES": "\\"
            page\\ ": 0, \\"
            pos\\ ":[0, 0, 0, 0]",
            "DATA_FIELD": "SERVICE_CREDIT",
            "DOCUMENT_USED": "TOF2.pdf"
    }, {
            "PREDICTED_VALUE": "—",
            "CONFIDENCE_LEVEL": 0.0,
            "HGHLGTD_COORDINATES": "\\"
            page\\ ": 0, \\"
            pos\\ ":[0, 0, 0, 0]",
            "DATA_FIELD": "CONTRACT_SIGN_DATE",
            "DOCUMENT_USED": "TOF2.pdf"
    }, {
            "PREDICTED_VALUE": "None",
            "CONFIDENCE_LEVEL": 0.98,
            "HGHLGTD_COORDINATES": "\\"
            page\\ ": 0, \\"
            pos\\ ":[0, 0, 0, 0]",
            "DATA_FIELD": "TERM_RIGHT",
            "DOCUMENT_USED": "TOF2.pdf"
    }, {
            "PREDICTED_VALUE": "Data not found",
            "CONFIDENCE_LEVEL": 0,
            "HGHLGTD_COORDINATES": "\\"
            page\\ ": 0, \\"
            pos\\ ":[0, 0, 0, 0}]",
            "DATA_FIELD": "EXP_DATE_FOR_TERM",
            "DOCUMENT_USED": "TOF2.pdf"
    }, {
            "PREDICTED_VALUE": "—",
            "CONFIDENCE_LEVEL": 0.0,
            "HGHLGTD_COORDINATES": "\\"
            page\\ ": 0, \\"
            pos\\ ":[0, 0, 0, 0]",
            "DATA_FIELD": "TERMINATION_RIGHT_DATE2",
            "DOCUMENT_USED": "TOF2.pdf"
    }, {
            "PREDICTED_VALUE": "No",
            "CONFIDENCE_LEVEL": 0.99,
            "HGHLGTD_COORDINATES": "\\"
            page\\ ": 0, \\"
            pos\\ ":[0, 0, 0, 0]",
            "DATA_FIELD": "TRANSITIONAL_CL",
            "DOCUMENT_USED": "TOF2.pdf"
    }, {
            "PREDICTED_VALUE": "Data not found",
            "CONFIDENCE_LEVEL": 0.0,
            "HGHLGTD_COORDINATES": "\\"
            page\\ ": 0, \\"
            pos\\ ":[0, 0, 0, 0]",
            "DATA_FIELD": "TRANSIT_SERVICE_REF",
            "DOCUMENT_USED": "TOF2.pdf"
    }]
}
```

In accordance with implementations of the present disclosure, the PredExt module 214 processes content of the structured dataset 218 through a set of ML models to identify clauses of the legal document 216 and provide a prediction for clauses of the legal document 216. In some examples, the prediction for a clause includes a value in a set of possible values for the respective clause, where a value can include a text string. Example values can include, without limitation, data not found, not applicable, no, yes, custom, standard, deleted, unknown, none. Example clauses and respective example predictions are described in further detail herein with reference to FIG. 3.

In some implementations, each ML model in the set of ML models used by the PredExt module 214 is specific to a clause in a set of clauses. In some examples, the set of clauses defines a universe of clauses expected to be included in legal documents, and an ML model is provided for each clause. For example, a first ML model can model text representative of a first clause and can be trained on first training data that includes multiple examples of text that are historically included the first clause and a respective label assigned to each example of text (e.g., in a supervised learning paradigm, in which training data is labeled). A second ML model can model text representative of a second clause and can be trained on second training data that includes multiple examples of text that are historically included the second clause and a respective label assigned to each example of text (e.g., in a supervised learning paradigm, in which training data is labeled).

In some implementations, a ML model processes the entirety of the structured dataset 218 to identify a presence of the clause that the respective ML model is specific to and, if present, provide a respective prediction (value). In some examples, if the clause that the ML model is specific to is not represented in the structured dataset 218, the value provided by the ML model reflects this (e.g., data not found, -).

In some implementations, a ML model processes a portion of the structured dataset 218 to provide a respective prediction. For example, the portion of the structured dataset 218 can be identified as representing a particular clause, and the portion is provided as input to the ML model that is specific to that clause. In some examples, one or more language processing algorithms can be used to process the structured dataset 218 and label respective portions as representing clauses in the set of clauses. In this manner, it can be determined, which ML model each portion is to be processed by for generating respective predictions.

In some implementations, different types of ML models are included in the set of ML models. For example, it can be determined that a first type of ML model provides more accurate predictions than a second type of ML model for a clause. Consequently, the ML model for the clause can be of the first type. Implementations of the present disclosure can be realized with any appropriate type of ML model. Example types of ML models can include, without limitation, a convolution neural network (CNN), a recurrent neural network (RNN), classifiers, and the like.

In some implementations, each ML model provides a predicted score for each prediction (value) output by the ML model. The predicted score represents a degree of confidence in the prediction output by the ML model. In some examples, predicted scores are provided in a range of [0, 1], where the higher the predicted score is, the more confidence in the accuracy of the prediction.

In accordance with implementations of the present disclosure, the OCR+ module 212 selectively executes OCR+ (customized OCR program) that takes in unstructured documents (e.g., a legal document 216 in PDF format) and returns a structured dataset 218. In some examples, the structured dataset 218 contains key textual and legal information determined from the legal document. In further detail, OCR+ applies a series of data transformations that maps tuples (x,y) representing unstructured document data to sets of structured observations:

$$f:(x,y) \mapsto csv(raw\_text, section\_header, url, table\_content)$$

where (x,y) are legal documents represented as sets of 2-dimensional coordinates in the PostScript description language (PDL), in which the PDF is written, and csv(raw_text, section_header, url, table_content) are structured data stored in comma-separated value (.csv) format containing observations (text data) corresponding to the document raw text, the section headers of the document, all uniform resource locators (URLs) that occur in the body of the text, and text content in tables.

Achieving the data transformations of OCR+ is not straightforward for several reasons. For example, some legal documents are stored only as PDF images, which out-of-the-box open source OCR packages (e.g., pytesseract) are unable to parse into text. As another example, some key legal contract information (e.g., subscription dates, terms and conditions) may be provided within document tables. Traditional OCR packages do not consistently or accurately parse text inside tables in PDF documents. This is because tables do not exist as unique data structures in the PDL. Rather, what appear as tables in a legal document are actually pixels in 2-dimensional space drawn around textual content. A standard OCR engine would not be able to distinguish the table lines and the textual content itself and attempt to process both as text, resulting in highly anomalous OCR results.

The OCR+ of the present disclosure solves these problems with a multi-step approach. In some implementations, in a first step, OCR+ determines whether a legal document is an image-based PDF or a searchable PDF (e.g., by the document type determination sub-module 212a). In some examples, a third-party package is used to determine the document type (e.g., https://camelot-py.readthedocs.io/en/master/). For example, the document (file) is provided as input to the third-party package, which provides an indicator that indicates the document type as output. In some examples, an image-based PDF is a computer-readable file that contains images of the legal document, which images are no different than digital photos and graphics to a computer. That is, a computer does not discern any text in an image-based PDF. Image-based PDFs can be generated by, for example, scanning or faxing the legal document. In some examples, a searchable PDF is a computer-readable file that contains text data of the legal document. Searchable PDFs can be generated by, for example, printing the legal document from a word processing program (e.g., MS Word) to a PDF printer.

If the legal document is a searchable PDF, traditional OCR functionality can be used to process the legal document (e.g., an open-source OCR package, such as pytesseract, executed by the OCR sub-module 212b). If the legal document is an image-based PDF, OCR+ (e.g., executed by the OCR+ sub-module 212c) applies a series of functions to convert the legal document into an image file format and then from image into text. For example, the legal document can be processed through a PDF-to-image convert (e.g., pdf2image executed by the document-to-image sub-module 212d), which receives the legal document as input and provides a set of images as output.

In some implementations, in a second step, to extract content in tables, each image in the set of images is processed by a table image detector (e.g., executed by the table recognition sub-module 212e) that determines whether a table is depicted within a respective image. When a table is detected, text from within the table lines is extracted and OCR is applied to the text (e.g., by the text extraction sub-module 212f) to obtain a raw string representation (i.e., text data). In some examples, table detection and extraction is performed using a third-party package (e.g., https://camelot-py.readthedocs.io/en/master/). In some examples, the third-party package processes the document and outputs table contents in data frames, in which the contents in each cell of an underlying table (depicted in the document) can be accessed.

In some implementations, the OCR+ functionality can evaluate whether text data can be extracted from the images (e.g., by the evaluation sub-module 212g). For example, it can occur that the legal document 216 results from scanning in or imaging a hard-copy upside down, or even side-ways. Consequently, text data cannot the extracted from the legal document 216. As another example, coloration of pixels within the legal document 216 can make it difficult to discern text. In response, the OCR+ functionality can include rotation and/or inversion of the legal document 216 for processing (e.g., executed by the rotate/invert sub-module 212h). For example, a pass of OCR+ functionality can be performed and it can be determined that text data cannot be extracted from the legal document 216. In response, the legal document 216 can be programmatically rotated and/or inverted and processed in another pass of OCR+ functionality. This can repeat until text is able to be extracted from the legal document 216.

As described herein, the OCR+ module 212 outputs text data determined from the legal document as the structured dataset 218. The output of the OCR+ module 212 is processed by the PredExt module 214, as described herein. The PredExt module 214 of the present disclosure solves two types of problems. A first problem is to determine the status of a pre-defined legal clause based on the text of the legal document itself. A second problem is returning and highlighting the text relevant to a specific legal clause.

With regard to determining the status of a pre-defined legal clause, determination of the legal status of a given clause in a contract is modeled as a text classification problem. More specifically, one or more ML models executed by the PredExt module 214 are each provided as a text classifier that maps words into classification results. This can be represented as:

$$f: w_n = [w_1, w_2, \ldots, w_n] \mapsto y_m = [y_1, y_2, \ldots, y_m]$$

where $w_n$ is a document represented by a set of real-valued vectors (i.e., a tensor) corresponding to each word in the document, and $y \in (0,1)$ is a set of binary classifications that map onto the status of distinct legal clauses. For example, and without limitation, a party may use the automated document review system of the present disclosure to review the legal document to determine whether it can use customer (counterparty to the legal document) usage data for its own analysis. To determine this, the PredExt module 214 of the present disclosure includes a ML machine learning model with a tensor of word vectors representing the document and set the label y=1 if the customer's usage data can be used, and y=0 if the customer's usage data cannot be used. During training, the model learns a function (f) relating the tensor representation of the legal document to the assigned label.

In general, a ML model is iteratively trained, where, at each iteration, a loss value is determined based on a loss function. The loss value represents a degree of accuracy of the output of the ML model. The loss value can be described as a representation of a degree of difference between the output of the ML model and an expected output of the ML model (both the input to the ML model and the expected output being provided from training data). In some examples, if the loss value does not meet an expected value (e.g., is not equal to zero), parameters of the ML model (e.g., parameters of the function being learned) are adjusted, and another iteration of training is performed. In some instances, this process is repeated until the loss value meets the expected value.

Despite advances in ML models for text classification, there are several issues with using traditional ML models at face value for clause status prediction. For example, there is no direct way for traditional ML models for text classification (e.g., deep learning, cross-gradient boosting) to guide ML model learning through addition of expert knowledge. To address this, implementations of the present disclosure include utilization of a novel set of text algorithms that combine legal expertise with lexical features to determine a relevant set of words for each classification. This can be represented as:

$$f(w_{r,c}, c) \mapsto w_{c1} = [w_1, w_2, \ldots, w_n]$$

Here, $w_{r,c}$ can be provided as legal terms that occur to the clause and c is a string representation of the clause. For example, "Order form shall have the same meaning as set forth in the GTC." The function $f$ first stores $w_{r,c}$ into a hash structure, and a legal document D is parsed into an array of sentences $S=[s_1, \ldots, s_n]$. In some examples, $w_{r,c}$ is a array mapping from legal terms to an integer indices, which can be generated by a third-party package (e.g., https://scikit-learn.org/stable/). Each sentence $s_i \in S$ is parsed into individual tokens. Each token conducts a lookup in $w_{r,c}$ for a match. The corresponding indices are stored in the output array. For example, the example string above, "Order form shall have the same meaning as set forth in the GTC," is converted to, for example, [40917, 40692, 40581, 40571, 40560, 29914, 29747, 29705, 26993, 18745, 17911, 17889, 17752, 17303]. In some examples, a token search in $w_{r,c}$ is by exact match. Because $w_{r,c}$ is constructed using terms from the entire training document set, out-of-vocabulary is not applicable during training sentence conversion. During operation, out-of-vocabulary tokens are dropped by the model.

A set of relevant sentences is returned and is used for training of the ML model. For example, the training data can include a label (e.g., expected prediction value) assigned to each relevant sentence or a sub-set of relevant sentences. When trained on such (relevant) sentence-label pairs, the ML models show significant improvements in performance, in terms of accuracy, over traditional ML models. In some examples, a sentence is first identified as a relevant sentence based on a Regular Expression match with predefined keywords and sentence structures. Next, a clause-specific configuration is applied to include sentences before and after the relevant sentence to return the relevant sentences for training.

Accordingly, and as described herein, the PredExt module 214 provides output in the form of the results 220, which are provided to the DCD AI Application 206. A user can view the results 220 of the classification and can identify any errors in the classification labels 228 as feedback 226. In this manner, any truly novel instances that lie outside of the distribution of the training data (e.g., clauses not seen in training data used to train the ML model(s)) can be captured. The feedback can be used in subsequent training (e.g., re-training) of the ML model(s).

FIG. 3 depicts a screenshot of an example UI 300 in accordance with implementations of the present disclosure. The example UI 300 includes a results section 302 and a document view section 304. The document view section 304 displays the legal document that was the subject of the automated review and the results, for which are displayed in the results section 302. For example, legal document is processed as described herein to generate a results file (e.g., the results file 220 of FIG. 2), and content of the results file is displayed in the results section.

In some implementations, the results section 302 provides a table that includes columns of data field, values, predicted score, further review, and approve. In some examples, data field corresponds to clauses within the legal document. In some examples, values correspond to a prediction for a respective clause made by a respective ML model. In some examples, predicted score corresponds to the predicted score output by the ML model for the prediction made by the ML model. In some examples, each of further review and approve provide UI elements that enable a user to provide feedback (e.g., feedback 226 of FIG. 2).

In further detail, if a clause is included in the legal document, a prediction is provided from a respective ML model and is represented within the results section 302. In the example of FIG. 3, example topics include DPA Audit Rights, EU Access, Excess Usage, and Exchange Rights among several others. For some clauses, a value (prediction of the respective ML model) is provided and a respective prediction score is provided. For some topics, a value is not provided (e.g., -) and a prediction score of null (0) is indicated. For example, it can be determined that the legal document does not include a particular clause, but a row for the clause is still represented within the results section 302 with the user interface elements disabled. In the example of FIG. 3, this is the case for the clauses Framework Agmt—Option 1, and Framework Agmt—Option 2, having "-" indicated for value (i.e., no prediction), prediction scores of 0, and user interface elements disable (e.g., depicted in dash).

In some implementations, user feedback is provided through user interaction with the user interface elements. For example, for further review, the user can select the checkbox to indicate that the particular clause is to undergo further review before approving or denying the prediction provided by the ML model. As another example, for approve, the user can select a slider interface element to either approve (Y) or deny (N) the prediction provided. Approval can be provided as positive feedback reinforcing the accuracy of the ML model for the label selected as the prediction (e.g., reinforcing the label applied from a set of labels 228 of FIG. 2). Deny can be provided as negative feedback with respect to accuracy of the ML model.

In some implementations, an interface element is provided that enables the user to select another value for a clause instead of the prediction. For example, an interface element 310 can be selected and, in response, a list of values can be provided. In some examples, the list of values includes the prediction and other possible values for the clause. The user can select a value form the list of values and approve the user-selected value. The text data representing the clause within the legal document and the user-selected value can be provided as training data for subsequent training (re-training) of the ML model that had provided the prediction. That is, the user-selected value can be provided as a label (e.g., in the set of labels 228 of FIG. 2) that is assigned to the text data to be used as training data in training of the ML model.

Figure 4:
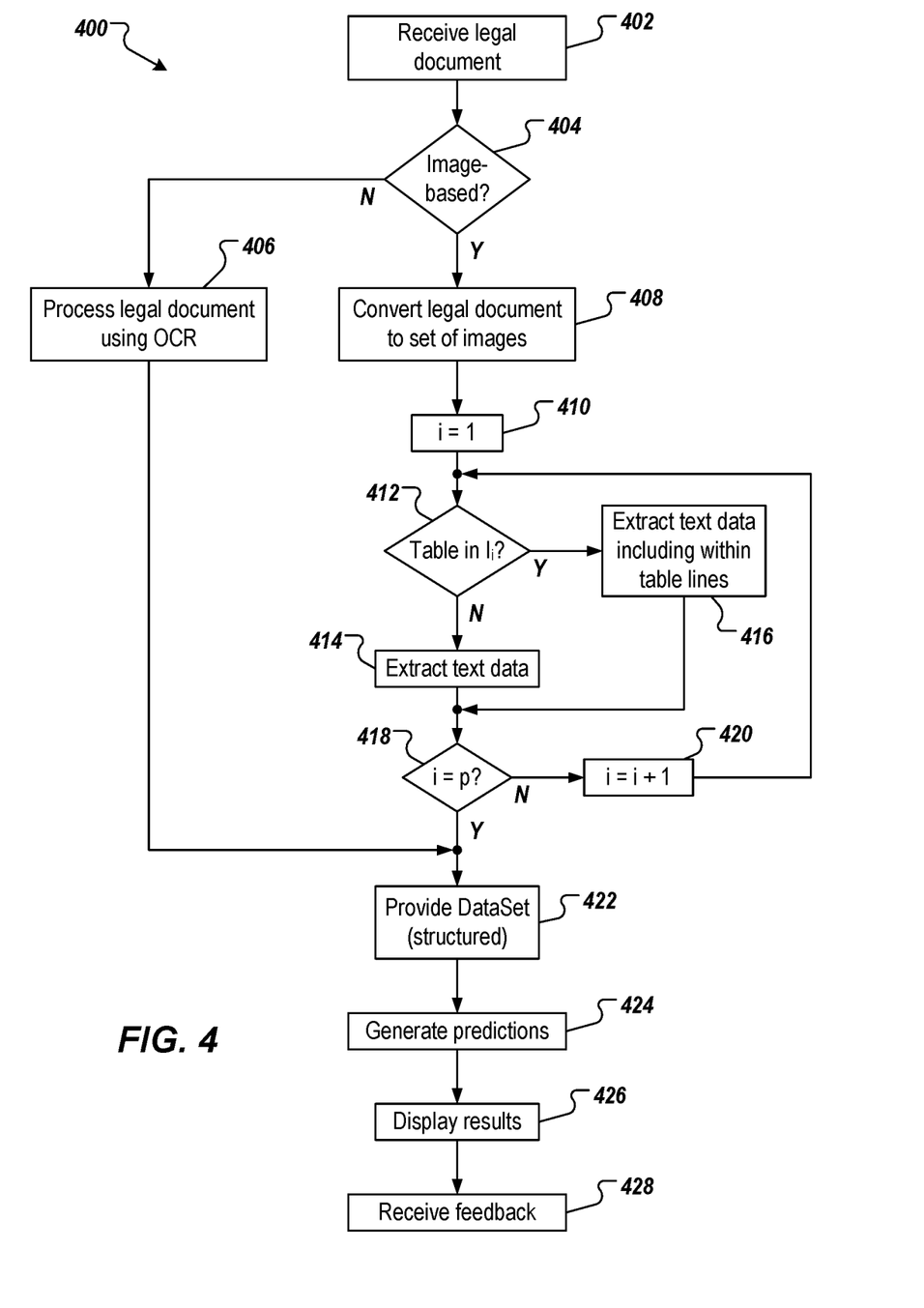
FIG. 4 depicts an example processes that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

A legal document is received (402). For example, the DCD AI Core 204 of FIG. 2 receives the legal document 216 (e.g., as a PDF file) from the CMS 202. It is determined whether the legal document is image-based (404). For example, the OCR+ module 212 determine whether the legal documents is image-based. If the legal document is not image-based, the legal document is processed using OCR to provide text data (406). For example, the OCR+ module 212 provides the legal document 216 as input to a traditional OCR engine (e.g., pytesseract), which processes the legal document 216 to provide the structured dataset 218.

If the legal document is image-based, the legal document is processed using OCR+ to provide text data. More particularly, the legal document is converted to a set of images (408). For example, the legal document is processed through a conversion program (e.g., pdf2image) to provide the set of images (e.g., $I=I_1, \ldots, I_p$, where p is the number of images in the set of images). A counter i is set equal to 1 (410). It is determined whether a table is depicted in image $I_i$ (412). For example, image processing is executed on the image to recognize the presence or absence of a table. If a table is not depicted in the image $I_i$, text data, if any, is extracted from the image $I_i$ (414). If a table is depicted in the image $I_i$, text data is extracted from the image $I_i$ including from within the table (416). It is determined whether the counter i is equal to p (418). That is, it is determined whether all images in the set of images have been processed. If the counter i is not equal to p, the counter i is incremented (420), and the example process 400 loops back. If the counter i is equal to p, a dataset is provided (422). For example, the OCR+ module 212 provides the structured dataset 218 including text data from the legal document 216 including any text data provided within tables depicted in the legal document 216.

Predictions are generated (424). For example, and as described herein, the PredExt module 214 processes text data within the structured dataset 218 through a set of ML models, each ML model being specific to a clause within legal documents, such as the legal document 216. Each ML model provides a prediction (value) and a prediction score, which are included in the results file 220. For example, text data is provided as input to a ML model, and in response, the ML model provides a prediction and a prediction score as output. Results are displayed (426). For example, the results file 220 is processed by the DCD AI Application 206, which displays results in a UI, such as the UI of FIG. 3. Feedback is received (428). For example, and as described above with reference to FIG. 3, a user can approve predictions, deny predictions, and/or change a prediction, each of which is provided as feedback for training (re-training) of respective ML models.

Figure 5:
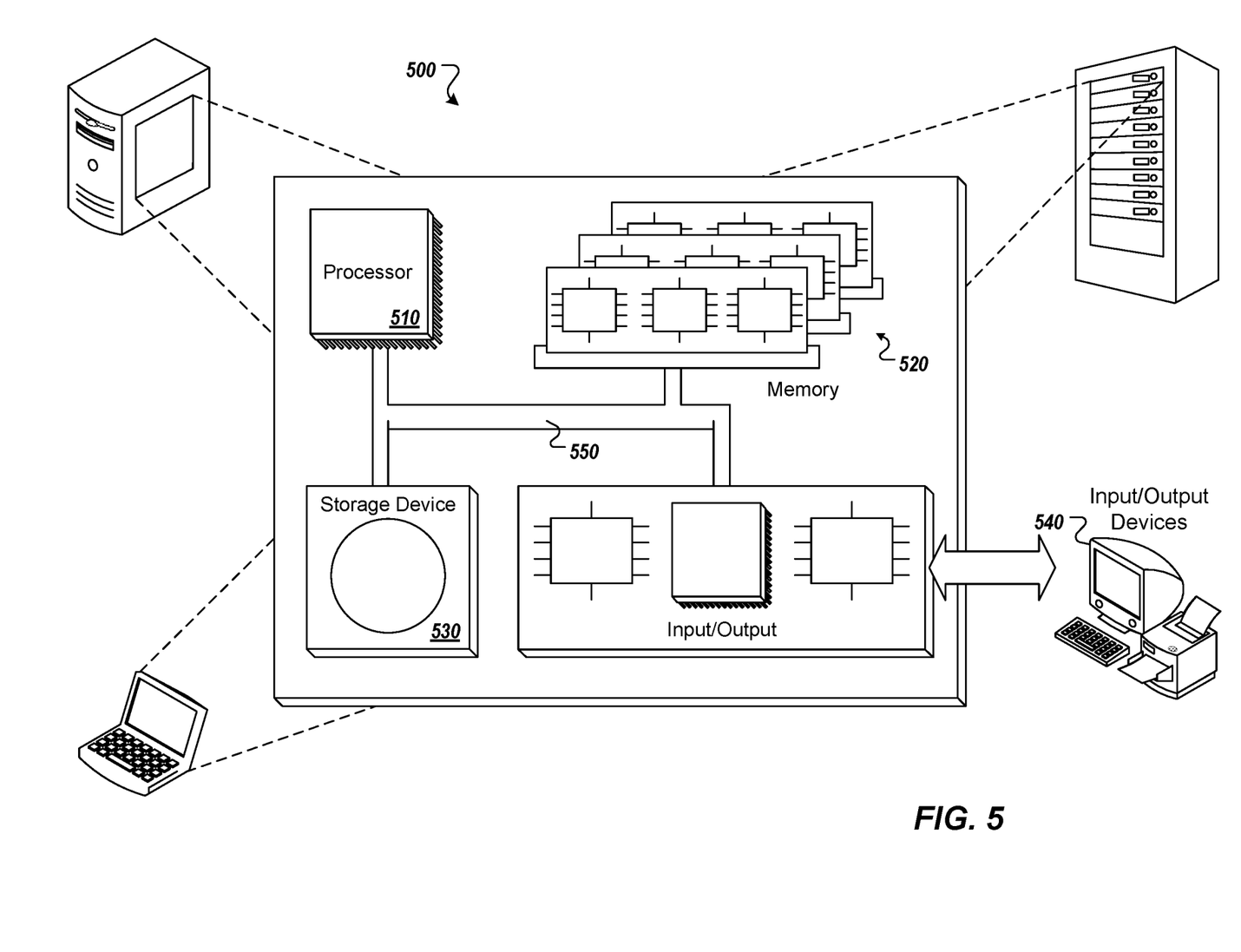
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for automated review of legal documents using an automated review system, the method being executed by one or more processors and comprising:
  receiving, by the automated review system, a legal document as a computer-readable file, the automated review system comprising a customized optical character recognition (OCR) module for processing documents of a first type and an OCR module for processing documents of a second type; and
  determining, by the automated review system, that the legal document is of the first type, and in response:
    converting, by the customized OCR module, the legal document to a set of images,
    extracting, by the customized OCR module, text data from one or more images in the set of images, the text data comprising sub-sets of text data, each sub-set of text data representing text in a respective clause of a set of clauses of the legal document,
    for each sub-set of text data, determining a clause from a set of clauses that the sub-set of text data is associated with, selecting a machine learning (ML)

model from a set of ML models, the ML model being specific to the clause, and receiving a prediction from the ML model, and outputting a set of predictions and respective prediction values for display in a user interface (UI).

2. The method of claim 1, wherein extracting text data from one or more images in the set of images comprises:
for at least one image in the set of images, determining that the at least one image depicts a table; and
extracting text data from the table within the at least one image.

3. The method of claim 1, wherein at least one ML model in the set of ML models is trained using training data comprising a set of relevant sentences for each clause in the set of clauses, each relevant sentence determined to be relevant to a legal term occurring within a respective clause.

4. The method of claim 3, wherein the set of relevant sentences is provided at least partially based on, for each clause in the set of clauses, representing the legal term as a hash structure, parsing the legal document into an array of sentences, and identifying matches between tokens of sentences and the hash structure.

5. The method of claim 1, further comprising receiving user input provided through the UI, the user input changing at least one prediction value for a respective clause, and being used to retrain a respective ML model.

6. The method of claim 1, wherein the set of ML models comprises a first ML model of a first type that is specific to a first clause, and a second ML model of a second type that is specific to a second clause, the second type being different from the first type.

7. The method of claim 1, wherein the first type comprises an image-based document.

8. A non-transitory computer-readable storage medium coupled to one or more processors and having instructions stored thereon which, when executed by the one or more processors, cause the one or more processors to perform operations for automated review of legal documents using a hybrid system, the operations comprising:
receiving, by the automated review system, a legal document as a computer-readable file the automated review system comprising a customized optical character recognition (OCR) module for processing documents of a first type and an OCR module for processing documents of a second type; and
determining, by the automated review system, that the legal document is of the first type, and in response:
converting, by the customized OCR module, the legal document to a set of images,
extracting, by the customized OCR module, text data from one or more images in the set of images, the text data comprising sub-sets of text data, each sub-set of text data representing text in a respective clause of a set of clauses of the legal document,
for each sub-set of text data, determining a clause from a set of clauses that the sub-set of text data is associated with, selecting a machine learning (ML) model from a set of ML models, the ML model being specific to the clause, and receiving a prediction from the ML model, and
outputting a set of predictions and respective prediction values for display in a user interface (UI).

9. The computer-readable storage medium of claim 8, wherein extracting text data from one or more images in the set of images comprises:
for at least one image in the set of images, determining that the at least one image depicts a table; and
extracting text data from the table within the at least one image.

10. The computer-readable storage medium of claim 8, wherein at least one ML model in the set of ML models is trained using training data comprising a set of relevant sentences for each clause in the set of clauses, each relevant sentence determined to be relevant to a legal term occurring within a respective clause.

11. The computer-readable storage medium of claim 10, wherein the set of relevant sentences is provided at least partially based on, for each clause in the set of clauses, representing the legal term as a hash structure, parsing the legal document into an array of sentences, and identifying matches between tokens of sentences and the hash structure.

12. The computer-readable storage medium of claim 8, wherein operations further comprise receiving user input provided through the UI, the user input changing at least one prediction value for a respective clause, and being used to retrain a respective ML model.

13. The computer-readable storage medium of claim 8, wherein the set of ML models comprises a first ML model of a first type that is specific to a first clause, and a second ML model of a second type that is specific to a second clause, the second type being different from the first type.

14. The computer-readable storage medium of claim 8, wherein the first type comprises an image-based document.

15. A system, comprising:
a computing device; and
a computer-readable storage device coupled to the computing device and having instructions stored thereon which, when executed by the computing device, cause the computing device to perform operations for automated review of legal documents using a hybrid system, the operations comprising:
receiving, by the automated review system, a legal document as a computer-readable file, the automated review system comprising a customized optical character recognition (OCR) module for processing documents of a first type and an OCR module for processing documents of a second type; and
determining, by the automated review system, that the legal document is of the first type, and in response:
converting, by the customized OCR module, the legal document to a set of images,
extracting, by the customized OCR module, text data from one or more images in the set of images, the text data comprising sub-sets of text data, each sub-set of text data representing text in a respective clause of a set of clauses of the legal document,
for each sub-set of text data, determining a clause from a set of clauses that the sub-set of text data is associated with, selecting a machine learning (ML) model from a set of ML models, the ML model being specific to the clause, and receiving a prediction from the ML model, and
outputting a set of predictions and respective prediction values for display in a user interface (UI).

16. The system of claim 15, wherein extracting text data from one or more images in the set of images comprises:
for at least one image in the set of images, determining that the at least one image depicts a table; and
extracting text data from the table within the at least one image.

17. The system of claim 15, wherein at least one ML model in the set of ML models is trained using training data comprising a set of relevant sentences for each clause in the set of clauses, each relevant sentence determined to be relevant to a legal term occurring within a respective clause.

18. The system of claim 17, wherein the set of relevant sentences is provided at least partially based on, for each clause in the set of clauses, representing the legal term as a hash structure, parsing the legal document into an array of sentences, and identifying matches between tokens of sentences and the hash structure.

19. The system of claim 15, wherein operations further comprise receiving user input provided through the UI, the user input changing at least one prediction value for a respective clause, and being used to retrain a respective ML model.

20. The system of claim 15, wherein the set of ML models comprises a first ML model of a first type that is specific to a first clause, and a second ML model of a second type that is specific to a second clause, the second type being different from the first type.

* * * * *